(12) United States Patent
Shen

(10) Patent No.: US 7,432,798 B2
(45) Date of Patent: Oct. 7, 2008

(54) METHOD THAT ACHIEVES THE THEFT-PROOF FUNCTION OF A CAR BY DETECTING THE PARKING LIGHT SYSTEM OF A CAR

(75) Inventor: Chu-Ping Shen, Taipei Hsien (TW)

(73) Assignee: Advance Security Inc., Taipei Hsien (TW)

( * ) Notice: Subject to any disclaimer, the term of this patent is extended or adjusted under 35 U.S.C. 154(b) by 147 days.

(21) Appl. No.: 11/350,801

(22) Filed: Feb. 10, 2006

(65) Prior Publication Data

US 2007/0188309 A1 Aug. 16, 2007

(51) Int. Cl.
*B60R 25/10* (2006.01)
*B60R 25/00* (2006.01)
*G08B 1/08* (2006.01)
*B60L 1/00* (2006.01)
*B60L 1/14* (2006.01)

(52) U.S. Cl. .............................. 340/426.1; 340/426.16; 340/428; 340/539.1; 307/10.1; 307/10.2; 307/10.8

(58) Field of Classification Search .................. None
See application file for complete search history.

(56) References Cited

U.S. PATENT DOCUMENTS 6,028,507 A * 2/2000 Banks et al. ................. 340/427

* cited by examiner

*Primary Examiner*—Julie Lieu
(74) *Attorney, Agent, or Firm*—Troxell Law Office, PLLC

(57) ABSTRACT

A method includes detecting the parking light system of a car to achieve the theft-proof function. It can detect and learn the how many flashes, the turn on/off time in each period and the voltage value of the parking light, which is produced when using a keyless transmitter module to lock/unlock the car door. And the system can be easily installed by setting up just one line collaborating with a smart learning module with a CPU inside and without corrupting the original structure of a car.

6 Claims, 4 Drawing Sheets

METHOD THAT ACHIEVES THE THEFT-PROOF FUNCTION OF A CAR BY DETECTING THE PARKING LIGHT SYSTEM OF A CAR

BACKGROUND OF THE INVENTION

1. Field of the Invention

A method that achieves the theft-proof function of a car by detecting the parking light system of a car. Especially, a method that can detect how many flashes, the turn on/off time in each period and the induced voltage value of the parking light produced when using a keyless transmitter module to lock/unlock the car door. By comparing the detected results with the conditions stored in the smart learning module, the module could react properly according to which condition is satisfied and to arm or disarm the theft-proof system.

2. Prior Art

Theft-proof system is used widely in our life to prevent cars from stolen. Usually, a car does not have a theft-proof system inside when it is just produced. In order to preserve the original structure of a car, the designer of the theft-proof system devises a kind of theft-proof device attached to the car, which can arm or disarm the theft-proof system when the user lock or unlock the car door using the keyless transmitter module. This kind of theft-proof device is so called Factory OEM Alarm.

Factory OEM alarms are commonly used as the theft-proof system when one want to utilize the locking system to arm or disarm the theft-proof system. In other words, the theft-proof system is directly connected to the locking system to detect the signal that lock or unlock the car door. However, one big disadvantage of this kind of theft-proof system is it is not easy to install, because the locking system of each car differ from kind to kind. And it is much more complicated about connection of wires in the computer car, once you misconnect the wire, not only the theft-proof system can not function but also the car door could not be opened.

In order to improve the disadvantage described above, this invention offer a kind of method that can detect and learn how many flashes, the turn on/off time in each period and the induced voltage value of the parking light produced when using a keyless transmitter module to lock/unlock the car door. By comparing the detected results with the conditions stored in the smart learning module, the module could react properly according to which condition is satisfied and to arm or disarm the theft-proof system. It has the advantage of being setup easily, because the system can be easily installed by setting up one line collaborating with a smart learning module with a CPU inside and without corrupting the original structure of a car. Moreover, no matter the traditional analog signal from a conventional car or the digital signal from the computer car, we can use this method to achieve the theft-proof function.

SUMMARY OF THE INVENTION

This invention offers a kind of method that can detect and learn how many flashes, the turn on/off time in each period and the induced voltage value of the parking light produced when using a keyless transmitter module to lock/unlock the car door. By comparing the detected results with the conditions stored in the smart learning module, the module could react properly according to which condition is satisfied and to arm or disarm the theft-proof system.

It has the advantage of being set up easily, because the system can be easily installed by setting up one line collaborating with a smart learning module with a CPU inside without corrupting the original structure of a car. No matter the traditional analog signal or the digital signal from the computer car, we can use this method to achieve the theft-proof function.

DETAIL DESCRIPTION OF THE PREFERRED EMBODIMENT

Figure 1:
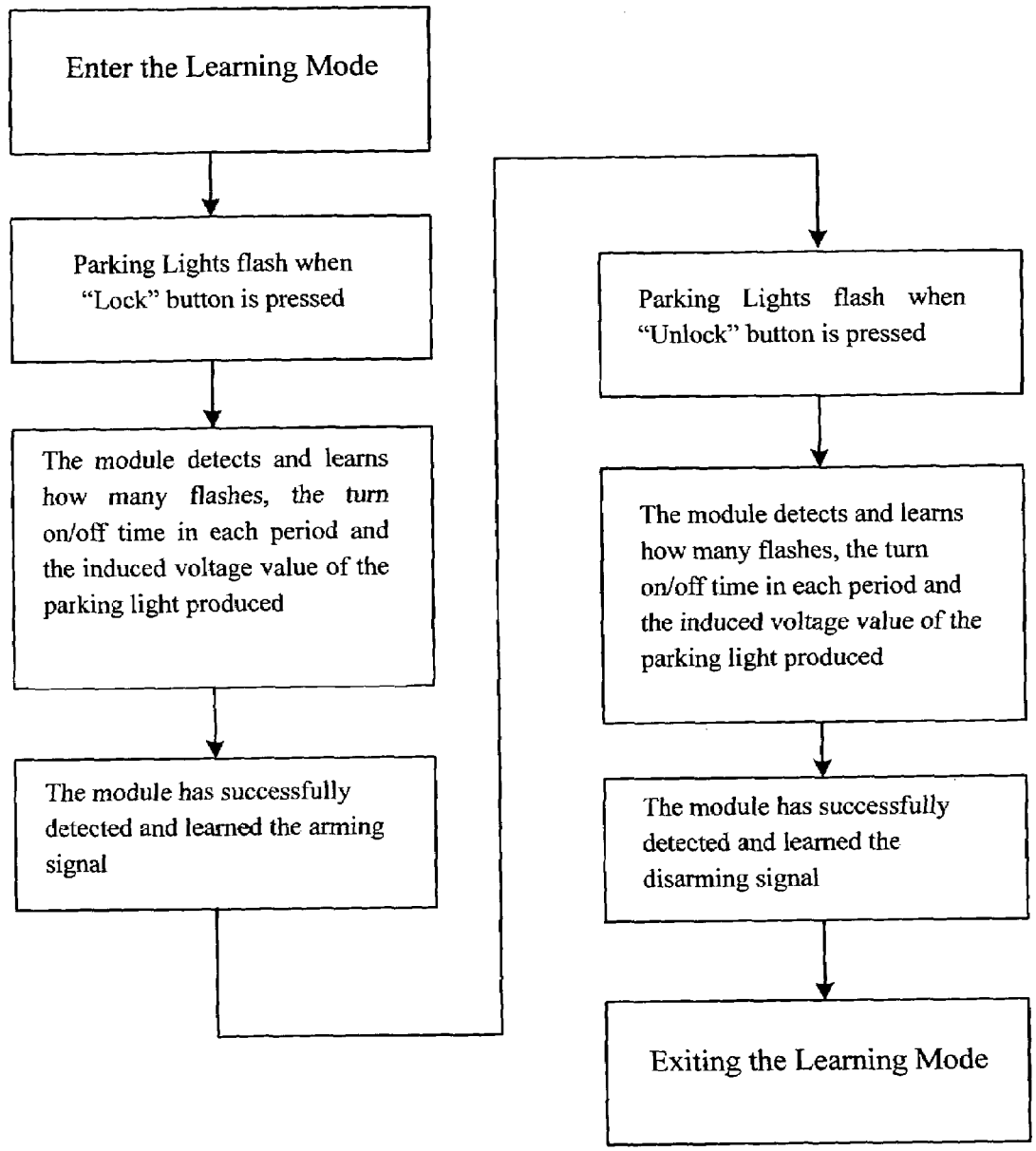
FIG. 1. Shows the steps to initializing and completing the learning routine of the smart learning module prior to the activation of the theft-proof function from the parking light system.

The method to achieve theft-proof function of a car by detecting the parking light system of a car as followed:

FIG. 1 illustrates the steps to initializing and completing the learning routine of the smart learning module prior to activate the theft-proof function from the parking light system of a car; the steps are:

(1) Turn the ignition switch "ON/OFF" 2 times and stay in OFF position. Within 15 seconds.

(2) Push the Valet switch 7 times and holding in on $7^{th}$ push until the parking light flashing once & one long chirp is hearing then release the valet switch.

(3) Press and release the "Lock button" on the key chain transmitter first, then press and release the "Unlock button" on the key chain transmitter to unlock the vehicle's door.

(4) Press the valet switch once. One long chirp to confirm this enter.

The above 4 steps will set the smart learning module into the learning mode (5) Press the "Lock button" on the key chain transmitter to lock the vehicle; one chirp to indicate the arm signal is learned.

(6) Press the valet switch once. One long chirp to confirm this enter.

(7) Press the "Unlock button" on the key transmitter to unlock the vehicle; two chirp to indicate the disarm signal is learned.

(8) Turn on the ignition switch to exit the learning routine, three long chirps from siren to confirm exit.

Figure 2:
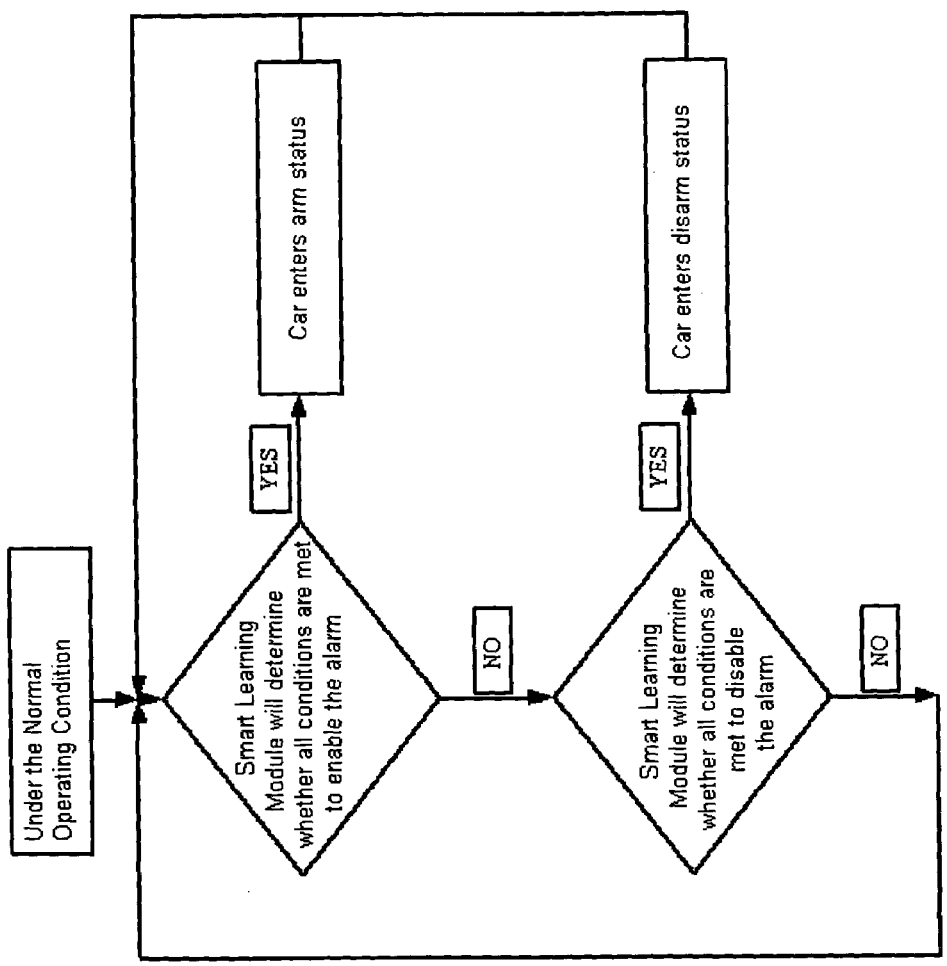
FIG. 2. Shows the condition the parking light system will response when the smart learning module is completed successfully.

FIG. 2 illustrates the condition the parking light system will response when the smart learning module has successful learned the arm/disarm signal: (1) Judge if the parking light satisfies all the conditions (how many flashes, the turn on/off time in each period and the voltage value of the parking light induced by, for example, a factory remote transmitter) that activate theft-proof system; if it does, the theft-proof system will be activated; if it does not, the theft-proof system will move to step (2). (2) Judge if the parking light satisfies all the conditions (how many flashes, the turn on/off time in each period and the induced voltage value of the parking light) that deactivate theft-proof system; if it does, the theft-proof system will be deactivated; if it does not, the theft-proof system will move to step (3). (3) The theft-proof system will remain the status.

Figure 3:
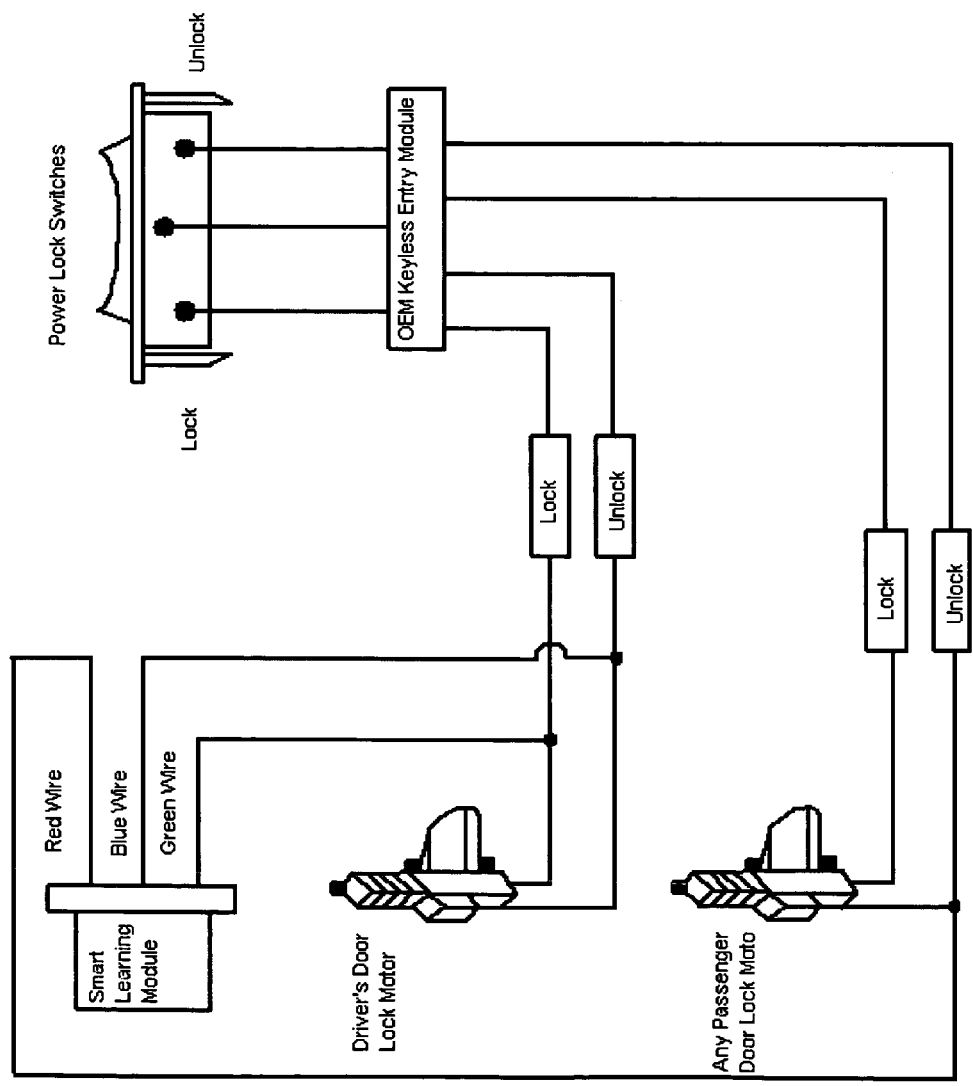
FIG. 3. Shows the preferred embodiment for the smart learning module.
Figure 4:
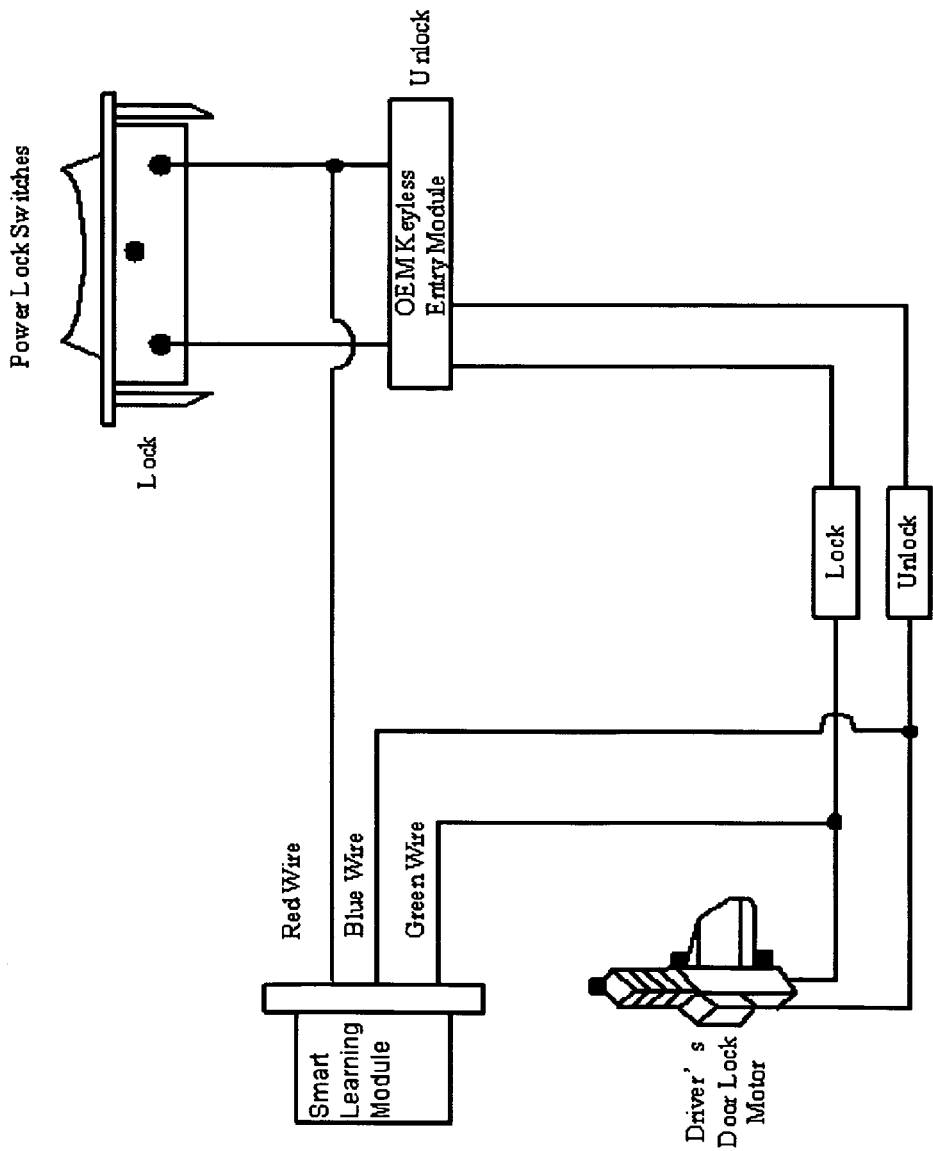
FIG. 4. Shows another preferred embodiment for the smart learning module.

The smart learning module is a control unit which includes a microprocessor and a memory mean capable of detecting, storing and comparing an electronic signal emitted from parking lights when a locking or unlocking car door common is triggered by the factory remote entry transmitter as shown in FIGS. 3-4. The microprocessor and the memory mean can detect, store and compare an electronic signal emitted from parking lights either from the number of flashes, the on and off period between each flash and/or the voltage produced during the flash. For example, in a standard factory automobile keyless entry system, the parking lights flash two times to indicate a locking condition has been triggered and flash once to indicate an unlocking condition has been triggered.

What is claimed is:

1. A method detecting the parking light system to achieve the theft-proof function of a car, which includes the following steps: (1) detect and learn the conditions that activate the theft-proof system; (2) detect and learn the conditions that deactivate the theft-proof system; (3) activate the parking light that satisfies the conditions in (1) to arm theft-proof system; (4) activate the parking light that satisfies the conditions in (2) to disarm theft-proof system.

2. The method of claim 1, wherein the way to detect and learn the conditions that activate the theft-proof system is: using a smart learning module to detect and learn how many flashes of the parking light, a time period between on/off cycles of the parking lights and the induced voltage value of the parking light produced when using a keyless transmitter module to lock and unlock the car door to be the conditions that activate the theft-proof system.

3. The method of claim 1, wherein the way to detect and learn the conditions that deactivate the theft-proof system is: using a smart learning module to detect and learn how many flashes, the turn on/off time in each period and the induced voltage value of the parking light which is produced when using a keyless transmitter module to lock/unlock the car door to be the conditions that deactivate the theft-proof system.

4. The method of claim 1, wherein the way to activate the parking light that satisfies the conditions in (1) to arm theft-proof system is: use the smart learning module to detect how many flashes of the parking light, the turn on/off time of the parking light in each period and the induced voltage value of the parking light produced when using a keyless transmitter module to lock the car door and compare the conditions stored in it to decide activate the theft-proof system or not.

5. The method of claim 1, wherein the way to activate the parking light that satisfies the conditions in (2) to arm theft-proof system is: use the smart learning module to detect how many flashes of the parking light, the turn on/off time of the parking light in each period and the induced voltage value of the parking light produced when using a keyless transmitter module to unlock the car door and compare the conditions stored in it to decide deactivate the theft-proof system or not.

6. The method of claim 1, wherein the way to realize the method is to install a smart learning module with a CPU inside to detect and learn the analog or digital signal from the parking light system when using a keyless transmitter module to lock and unlock the car door, and then the module will execute command to arm/disarm the theft-proof system of the car.

* * * * *